United States Patent

Sailer et al.

[11] 3,915,952
[45] Oct. 28, 1975

[54] POLYAZO COMPOUNDS CONTAINING 2,4,2',4'-TETRAHYDROXY-DIBENZYLAMINE AS COUPLING COMPONENT

[75] Inventors: Andre Louis Sailer; Pierre Frank, both of Saint-Clair du Rhone, France

[73] Assignee: Pechiney Ugine Kuhlmann, Paris, France

[22] Filed: Jan. 24, 1972

[21] Appl. No.: 220,379

[30] Foreign Application Priority Data
Jan. 26, 1971 France .............................. 71.02434

[52] U.S. Cl. ...................... 260/169; 8/13; 260/143; 260/144; 260/145 C; 260/148; 260/166; 260/173; 260/184
[51] Int. Cl.. C09b 33/04; C09b 33/18; C09b 33/20
[58] Field of Search ........... 260/169, 173, 170, 172

[56] References Cited
UNITED STATES PATENTS
2,897,188   7/1959   Weissert et al. ................ 260/169 X OTHER PUBLICATIONS
Index Chemicus, Vol. 20, (1966), No. 62221.

Primary Examiner—Floyd D. Higel
Assistant Examiner—C. F. Warren
Attorney, Agent, or Firm—Browne, Beveridge, DeGrandi & Kline

[57] ABSTRACT

Azo dyes of the formula:

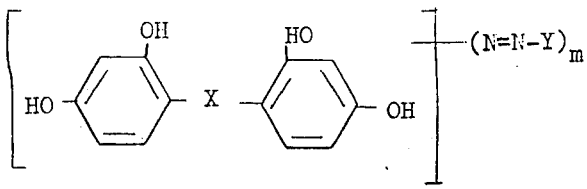

wherein X represents the bivalent grouping —CH$_2$—NH—CH$_2$—, m represents an integer of 2 to 4, and Y represents a radical of the benzene, naphthalene, heterocyclic or azo series, at least one of which is substituted by at least one sulphonic or carboxylic acid group, and salts thereof with an amine or ammonium compound, and nitrosated, oxidised and metalliferous derivatives thereof; the dyes, derivatives and salts are useful for the color-finishing of leathers, for example for the aniline finishing of skins, whether or not previously dyed, and for the finishing of leathers with a buffed or artificial hair side, as well as for the spray-gun dyeing of full-grain leathers on which they give very vivid transparent shades which are very fast, especially to light and wet rubbing.

2 Claims, No Drawings

POLYAZO COMPOUNDS CONTAINING 2,4,2′,4′-TETRAHYDROXY-DIBENZYLAMINE AS COUPLING COMPONENT

The present invention concerns new polyazo dyes which are of particular interest for the colouration of leathers.

We have found that it is possible to dye leathers of various tannings in strong shades which are fast to light, to wet tests, to solvents, to rubbing and to grinding by applying onto them a dyestuff of the general formula:

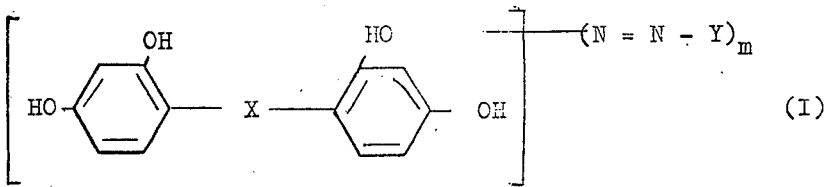

or an oxidised, nitrosated or metalliferous derivative thereof.

In the above formula X represents the bivalent grouping —$CH_2$—NH—$CH_2$—, $m$ represents 2, 3 or 4, and Y represents a radical of the benzene, naphthalene, heterocyclic or azo series, at least one of which is substituted by at least one sulphonic or carboxylic acid group. The Y radicals may be the same as, or different from, each other.

The invention also comprises the salts of the said dyestuffs with amines and ammonium compounds.

The dyestuffs of formula (I) may be prepared for example by coupling the diazo derivative of a compound Y-$NH_2$ or of the diazo derivatives of such compounds with a coupling compound of the formula:

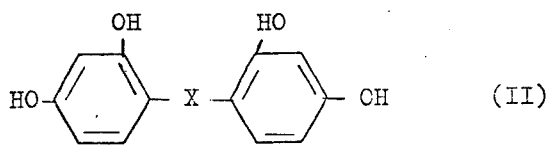

in which formulae X and Y have the same significance as above, in the proportion of 2 to 4 molecules of diazo derivative to one molecule of coupling compound.

The couplings occur in the ortho position to the hydroxy groups. The dyestuffs of formula (I) wherein the Y residues are different from each other are advantageously prepared by carrying out successively the couplings of the respective diazo derivatives.

Examples of amines of formula Y-$NH_2$ are: the anilines, the naphthylamines, the aminophenols, the amino naphthols, the aminodiphenylamines, their sulphonated or carboxylated derivatives. These amines may carry other substituents such as for example halogen atoms, alkyl, alkoxy, nitro, amino, acylamino groups, or azo radicals such as those of the benzene and naphthalene series; they may also carry in the ortho position to the amino group, groups which are capable of taking part in the formation of metalliferous complexes. The substituent alkyl and alkoxy groups preferably contain 1 or 2 carbon atoms and the preferred acylamino groups are the acetylamino and oxalylamino groups.

The dyestuffs of formula I wherein Y represents an azo grouping may also be prepared by coupling the diazo derivative of a diazotisable primary aromatic amine possessing a free coupling position or the diazo derivatives of such amines with a compound of formula II in the proportion of two to four molecules of the diazo derivative to one molecule of the coupling compound and coupling the azo dyestuff so obtained with the diazo derivative of a diazotisable primary aromatic amine.

The following compounds having a free coupling position may for example be used: 3,6-disulpho-8-hydroxy-1-naphthylamine, 6-sulpho-8-hydroxy-2-naphthylamine, 7-sulpho-5-hydroxy-2-naphthylamine, and 4-sulpho-8-hydroxy-1-naphthylamine.

The coupling compound of formula (II) may be prepared, for example, by condensation in aqueous medium of two moles of resorcinol and two moles of formaldehyde with one mole of ammonium chloride.

The dyestuffs of formula (I) are soluble in water. They dye leathers of various tannings in vivid brown shades which are very fast in particular to light, wet tests, solvents, rubbing and grinding.

The nitrosation of dyestuffs of the formula (I) wherein m is 2 has a hypsochromic effect on the shade of the initial colour. The nitrosation may be effected in acid medium, preferably at a pH of between 0.5 and 4, and at a temperature of between −10°C and +90°C, preferably between 0°C and 30°C. The quantity of nitrous acid may vary according to the shade desired. The nitrosation takes place in the ortho position to a hydroxy group.

Oxidation of the dyes of formula (I) gives dyes which dye the leathers of various tannings in browner shades than the starting dyes, whilst the oxidation of disazo dyes of formula (I) previously nitrosated has a slightly hypsochromic effect on the shade. The oxidation may be effected in neutral or acid medium, but preferably in alkaline medium, for example in the presence of ammonia or of a hydroxide, carbonate or bicarbonate of an alkali metal. Suitable oxidising agents include air, the hypochlorites, the peroxides such as hydrogen peroxide, the per salts such as the permanganates of sodium or of potassium, the bichromates of sodium or of potassium, the metal oxides, such as manganese dioxide. The shade of the dye obtained may vary slightly according to the nature and the quantity of the oxidising agent utilized.

The dyes of formula (I) wherein one of the Y residues carries in the ortho position to the azo bond a complex-forming group, for example a hydroxy, amino, alkoxy, carboxy or —$OCH_2$—COOH group, and the nitrosated derivatives of disazo dyes of formula (I), may be converted to metal complexes with metals such as for example iron, copper, chromium, cobalt or nickel. The metallization may be effected for example according to known processes in aqueous medium or in a mixture of water and an organic solvent such as for example an alcohol, polyol, formamide or dimethyl formamide, at a temperature of between 10°C and 150°C and at a pH of between 1 and 11, preferably between 5 and 8. Suitable metallizing agents which may be used include for example the metal chlorides, fluorides, acetates, sulphates, oxides and hydroxides, as well as alkali metal chromates and bichromates. The metalliferous complexes so obtained provide shades on leather which are of excellent fastness, especially to light.

The dyes of formula (I) and their nitrosated, oxidized or metalliferous derivatives may be made into salts by means of an amine or a quaternary ammonium salt. Among possible amines may be mentioned, for example, the aryl guanidines, cyclohexylamine or dicyclohexylamine. The salts obtained are insoluble in water, but soluble in organic solvents, in particular in alcohols and diols. As ammonium salts may be mentioned, for example the chlorides, acetates or sulphates of N,N-dimethyl N-benzyl N-alkyl ammonium, and the chloride of 2'-hydroxy ethyl trimethylammonium. The salts may be used for the colourfinishing of leathers, for example for the aniline finishing of skins, whether or not previously dyed, and for the finishing of leathers with a buffed or artificial hair side, as well as for the spray-gun dyeing of full-grain leathers on which they give very vivid transparent shades which are very fast, especially to light and to wet rubbing.

The invention is illustrated with reference to the following Examples in which the parts indicated are by weight unless stated otherwise.

EXAMPLE 1

The diazo derivative obtained from 34.6 parts of p-sulphanilic acid was introduced during 30 minutes into a solution of 29.75 parts of the hydrochloride of bis-(2,4-dihydroxy benzyl)amine in 400 parts of water at 5°C. to which had been added 35 parts of an aqueous solution of sodium hydroxide at 36° Be and 20 parts of sodium carbonate. The diazo dye obtained was separated by the addition of sodium chloride. It consisted of bis (4'-sulpho 5-phenylazo-2,4-dihydroxy benzyl)amine. It dyes leathers of various tannings in orange-brown shades which show excellent fastness to solvents and to grinding.

The hydrochloride of bis-(2,4-dihydroxybenzyl)amine used in this Example may be prepared as follows: 110 parts of resorcinol were dissolved at 60°C. in 150 parts of water and then 27 parts of ammonium chloride and 100 parts of a 30 percent aqueous solution of formaldehyde were introduced. The mixture was heated to 85°C. and maintained at this temperature for 2 hours. A clear, amber-coloured solution of the hydrochloride of bis-(2,4-dihydroxybenzyl)amine in quantitative yield was obtained. By neutralizing to pH 7 a white precipitate of bis(2,4-dihydroxybenzyl)amine was obtained, a not very stable product, which redissolved on addition of an excess of sodium hydroxide.

EXAMPLE 2

Example 1 was repeated except that the p-sulphanilic acid was replaced by 37.8 parts of 2-aminophenol 4-sulphonic acid. A disazo dye is obtained which dyes leathers of various tannings in slightly more red shades. The dye was bis(5'-sulpho 2'-hydroxy-5-phenylazo-2,4-dihydroxybenzyl)amine.

EXAMPLE 3

Example 1 was repeated except that the p-sulphanilic acid was replaced by 46.8 parts of 4-nitro 2-aminophenol 6-sulphonic acid. A disazo dye was obtained which dyes the leathers of various tannings in brown-red shades. The dye was bis(5'-nitro 3'-sulpho 2'-hydroxy 5-phenylazo 2,4-dihydroxybenzyl)amine.

EXAMPLE 4

Example 3 was repeated except that the 4-nitro 2-aminophenol 6-sulfonic acid was substituted by the same quantity of 6-nitro 2-aminophenol 4-sulphonic acid. A disazo dye was obtained which dyes leathers of various tannings in slightly more red shades. The dye was bis(5'-sulpho 3'-nitro 2'-hydroxy 5-phenylazo 2,4-dihydroxy benzyl)amine.

EXAMPLE 5

By the method of Example 1 the diazo derivative of 34.6 parts of p-sulphanilic acid was coupled with 29.75 parts of the hydrochloride of bis-(2,4-dihydroxy benzyl)amine. When the coupling was complete, the mixture was adjusted to pH5 by the addition of 35 parts of a 20° Bé. hydrochloric acid solution. Then, within 30 minutes, a solution of 14 parts of sodium nitrite in 28 parts of water was added. The nitrosation was allowed to proceed at 10°C. and the nitroso disazo dye was separated by the addition of sodium chloride. It dyes leathers of various tannings in more yellow shades than those obtained with the non-nitrosated dye of Example 1.

EXAMPLE 6

By the method of Example 1 the diazo derivative of 34.6 parts of sulphanilic acid was coupled with 29.75 parts of the hydrochloride of bis-(2,4-dihydroxy benzyl)amine, and the pH was then adjusted to 6 by the addition of hydrochloric acid. The mixture was then heated to 70°C., 100 parts of an aqueous ammonia solution 20° Be were added followed by 5 parts of a solution of 35 percent hydrogen peroxide. The mixture was maintained for one hour at 70°C. and then the oxidized dye was separated by salting out with sodium chloride. This dye dyes leathers of various tannings in slightly more brown shades than those obtained with the non-oxidized dye of Example 1.

EXAMPLE 7

A solution of 29.75 parts of the hydrochloride of bis-(2,4-dihydroxybenzyl)amine in 200 parts of water were gradually introduced into a solution of the diazo derivative obtained from 17.3 parts of p-sulphanic acid. After 4 hours of coupling at pH 2, the pH was adjusted to 3.5 by the addition of an aqueous solution of sodium carbonate. When the coupling had been completed, 45 parts of sodium carbonate were added and then, within 30 minutes, a solution of the diazo derivative obtained from 27.6 parts of 4-nitro aniline. When the coupling had been completed a trisazo dye was separated. It dyes leathers of various tannings in brown-yellow shades. This dye was 2,4,2',4'-tetrahydroxy 5-(4-sulpho phenylazo) 3,5' or 3',5'-bis(4-nitro phenylazo) dibenzylamine.

EXAMPLE 8

Example 7 was repeated except that the 4-nitro aniline was substituted by 30.9 parts of 4-amino 4'-nitro-diphenyl-amine-2'-sulphonic acid. A disazo dye was obtained which dyes leathers of various tannings in brown-orange shades. This dye was N-(4'-sulpho-5-phenylazo 2,4-dihydroxy benzyl) N-[4'-(4-nitro 2-sulphophenylamino) 5-phenylazo 2,4-dihydroxy benzyl] amine.

EXAMPLE 9

Example 8 was repeated except that 92.7 parts of 4-amino 4'nitro-diphenylamine-2'-sulphonic acid were used instead of 30.9 parts. A tetrakis azo dye was obtained which dyes leathers of various tannings in darker and redder shades. This dye was 2,4,2',4'-tetrahydroxy 5-(4-sulpho phenylazo)-3,3'5'-tris[4-(4-nitro 2-sulpho phenylamino) phenylazo] dibenzylamine.

EXAMPLE 10

A solution of the diazo derivative obtained from 44.6 parts of 1-amino naphthalene 6-sulphonic acid was added during 30 minutes to a solution of 29.75 parts of the hydrochloride of bis-(2,4-dihydroxybenzyl)amine in 400 parts of water at 5°C. to which had been added 35 parts of a 36°Bé solution of sodium hydroxide and 40 parts of sodium carbonate. When the coupling was completed a solution of the diazo derivative obtained from 17.3 parts of p-sulphanilic acid was added over 30 minutes. When the coupling was completed the trisazo dye was separated. It dyes leathers of various tannings in brown shades. This dye was 2,4,2',4'-tetrahydroxy 3-(4-sulphophenylazo)-5,5'-bis-[6-sulpho naphthylazo(1)] dibenzylamine.

EXAMPLE 11

Example 10 was repeated except that the p-sulphanilic acid was substituted by 13.8 parts of 4-nitroaniline. A trisazo dye was obtained which dyes leathers of various tannings in brown shades. The dye was 2,4,2',4'-tetrahydroxy 3-(4-nitro phenylazo)-5,5'-bis-[6-sulpho naphthylazo(1)] dibenzylamine.

EXAMPLE 12

Example 10 was repeated except that the 1-amino naphthalene 6-sulphonic acid was substituted by 34.6 parts of p-sulphanilic acid and the p-sulphanilic acid was substituted by 13.8 parts of 4-nitroaniline. A trisazo dye was obtained which dyes leathers of various tannings in brown-yellow shades. The dye was 2,4,2',4'-tetrahydroxy 3-(4-nitro phenylazo) -5,5'-bis-(4-sulpho phenylazo) dibenzylamine.

EXAMPLE 13

Example 12 was repeated except that the 4-nitroaniline was substituted by 34.5 parts of 2-chloro 4-nitroaniline. A tetrakisazo dye was obtained which dyes leathers of various tannings is slightly more yellow shades. The dye was bis [2,4-dihydroxy 5-(4-sulphophenylazo) 3-(2-chloro 4-nitro phenylazo) benzyl] amine.

EXAMPLE 14

Example 12 was repeated except that the 4-nitroaniline was substituted by 13.8 parts of 2-nitroaniline. A trisazo dye was obtained which dyes leathers of various tannings in brown-yellow shades. The dye was 2,4,2',4'-tetrahydroxy 3-(2-nitro phenylazo) -5,5'-bis-(4-sulpho phenylazo) dibenzylamine.

EXAMPLE 15

Example 10 was repeated except that the 1-aminonaphthalene 6-sulphonic acid was substituted by 37.8 parts of 3 amino 4-hydroxy benzene sulphonic acid and the p-sulphanilic acd was substituted by 27.6 parts of 4-nitroaniline. A tetrakisazo dye was obtained which dyes leathers of various tannings in brown-orange shades. The dye was bis [2,4-dihydroxy 5-(2-hydroxy 5-sulpho phenylazo) 3-(4-nitro phenylazo) benzyl] amine.

EXAMPLE 16

A solution of the diazo derivative obtained from 31.9 parts of 1-amino 8-naphthol 3,6-disulphonic acid was added over 30 minutes to a solution at 5°C of 29.75 parts of the hydrochloride of bis(2,4-dihydroxybenzyl)amine in 400 parts of water to which had been added 50 parts of a 36° Bé solution of sodium hydroxide, and 45 parts of sodium carbonate. When the coupling was completed a solution of the diazo derivative obtained from 9.3 parts of aniline is added over 30 minutes to the solution of the monoazo dye. When the coupling has been completed the disazo dye was separated. It dyes leathers of various tannings in brown shades. This dye was [3,6-disulpho 8-hydroxy naphthalene]<1 azo 5> [2,4,2',4'-tetra hydroxy dibenzylamine] - <5'azo 1> -[benzene].

EXAMPLE 17

To the solution of the monoazo dye prepared according to Example 16 from 31.9 parts of 1-amino 8-naphthol 3,6-disulphonic acid and 29.75 parts of the hydrochloride of bis-(2,4-dihydroxy benzyl)amine was added over 30 minutes to a solution of the diazo derivative obtained from 61.8 parts of 4-amino 4'-nitro diphenylamine 2'-sulphonic acid and then that of the diazo derivative obtained from 27.6 parts of 4-nitroaniline. When the coupling had been completed the pentakisazo dye was separated. The dye was 2,4,2-',4'-tetrahydroxy-3,3'-bis-(4-nitro phenylazo) -5' [4-(4-nitro-2-sulpho phenylamino phenylazo 5-{3,6-disulpho 8-hydroxy-7-[4-(4-nitro 2-sulpho phenylamino) phenylazo] naphthylazo (1) } dibenzylamine and dyes leathers of various tannings in dark-brown shades.

EXAMPLE 18

Example 17 was repeated except that 92.7 parts of 4 amino 4'-nitro-diphenylamine-2'-sulphonic acid were used instead of the 61.8 parts of the 4-nitroaniline was substituted by 9.3 parts of aniline. A pentakisazo dye was obtained which dyes leathers of various tannings in dark brown shades. This dye was 2,4,2',4'-tetrahydroxy 3-(or 3')-phenylazo-3'(or 3), 5'-bis-[4-(4-nitro 2-sulpho phenylamino) phenylazo] 5- {3,6-disulpho 8-hydroxy 7[4-(4-nitro 2-sulpho phenylamino) phenylazo] naphthylazo (1) } dibenzylamine.

EXAMPLE 19

A solution of the diazo derivative obtained from 61.8 parts of 4-amino-4'-nitro-diphenylamine 2'-sulphonic acid was introduced within 30 minutes at 5°C. and at pH 7 into a solution of 63.8 parts of 1-amino-8-naphthol-3,6-disulphonic acid in 400 parts of water to which had been added 50 parts of sodium carbonate. When the monoazo dye had been formed a 20°Bé solution of hydrochloric acid was added until the pH was 5 and then another 70 parts of this same solution were added. Then in the course of 15 minutes a solution of 14 parts of sodium nitrite in 28 parts of water was added, the mixture was maintained for 3 hours at 10°C. and in the course of 40 minutes the solution of the azo diazo derivative so obtained was introduced into a solution of 29.75 parts of bis-(2,4-dihydroxy benzyl) amine in 400 parts of water at 5°C., to which had been added 30 parts of a 36°Bé sodium hydroxide solution and 50 parts of sodium carbonate. 30 parts of sodium carbonate were added to the tetrakisazo dye so obtained, then within 30 minutes, the solution of the diazo derivative obtained from 24.6 parts of 2-methoxy aniline. When the coupling had been completed the hexakisazo dye was separated. The dye was bis {{ 3-(2-methoxy phenylazo)5-{3,6 disulpho 8-hydroxy 7-[-4 -(4-nitro 2-sulpho phenylamino) phenylazo] napthylazo (1) } 2,4-dihydroxybenzyl }}amine and dyes leathers of various tannings in bronze shades.

EXAMPLE 20

A solution of the diazo derivative obtained from 63.8 parts of 1-amino-8-naphthol-3,6-disulphonic acid was added over 30 minutes to a solution of 29.75 parts of the hydrochloride of bis(2,4-dihydroxy benzyl) amine in 400 parts of water at 5°C, to which had been added 30 parts of a 36°Bé solution of sodium hydroxide and 50 parts of sodium carbonate. When the coupling had been completed a solution of the diazo derivative of 12.3 parts of 2-methoxy aniline are added within 30 minutes and then a solution of the diazo derivative of 30.9 parts of 4-amino-4'-nitro-diphenylamine-2'-sulphonic acid. When the coupling had been completed the tetrakisazo dye was separated The dye was [2-methoxy benzene]-<1 azo 7> - [3,6-disulpho-8-hydroxy naphthalene] - <1 azo 5> - [2,4,2,',4'-tetrahydroxy dibenzylamine] - <5 azo 1> [3,6-disulpho-8-hydroxy-naphthalene] <7 azo 4> -[4'nitro 2'-sulpho diphenylamine] and dyes leathers of various tannings in darkbrown shades.

EXAMPLE 21

79.5 parts of the disodium salt of the dye prepared according to Example 3 were dissolved in 1,000 parts of water and then 16.4 parts of ferric chloride dissolved in 100 parts of water were added. The pH was adjusted to 5.5 by the addition of an aqueous solution of sodium hydroxide and the mixture was stirred for 2 hours. The 1:2-iron complex of the disazo dye of Example 3 was separated. It dyes leathers of various tannings in dark yellow brown shades which are particularly fast to the usual tests.

EXAMPLE 22

Example 21 was repeated except that the dye of Example 3 was substituted by 79.5 parts of the dye prepared according to Example 4. A dye was obtained which dyes leather of various tannings in slightly redder shades.

EXAMPLE 23

To a solution of 70.5 parts of the dye of Example 2 in 1000 parts of water were added 26.8 parts of chromium sulphate octahydrate and 30 parts of sodium acetate. The mixture was heated to 90°C and held for 2 hours at that temperature. The 1:2 chromium complex of the dye of Example 2 was separated. It dyes leathers of various tannings in brown-red shades which are particularly fast to the usual tests.

EXAMPLE 24

41.4 parts of the disodium salt of the dye prepared in Example 14 were dissolved in 2,000 parts of water at 60°C. In the course of one hour a solution of 23.9 parts of diorthotolyl guanidine in 250 parts of water and 11 parts of a solution of 10 N hydrochloric acid were added. The dye in the form of the amine salt was filtered, washed with water and dried. It was complete insoluble in water, but easily soluble in alcohols such as ethanol and in the monomethyl ether of ethylene glycol. The dilute alcoholic solutions are brown-yellow.

EXAMPLE 25

Example 24 was repeated except that the dye of Example 14 was substituted by 40.2 parts of the tetrasodium salt of the dye prepared in Example 17. A dye in the form of a di-orthotolyl guanidine salt was obtained which gives dilute alcoholic solutions having a brown colour.

EXAMPLE 26

A specimen of 100 parts of clear chrome box-calf (calculated on the shaved leather) was rinsed, neutralized and then rinsed again. This leather was introduced into a fulling machine containing a solution of 1 part of the dye of Example 21 in 500 parts of water at 60°C. The material was fulled for 45 minutes at 60°C. then a tawing paste was introduced suspended in 50 parts of water with the help of a dispersing agent and the material was fulled again for 30 minutes. The box-calf was dyed to a dark yellow brown shade, fast to light, to washing and to solvents.

EXAMPLE 27

100 parts of clear chrome suede leather was rewetted in the presence of a little ammonia, rinsed and introduced into a fulling machine containing a solution of 6 parts of the dye of Example 21 in 2,000 parts of water at 60°C. The material was fulled for one hour at 60°C. then 3 parts of formic acid were introduced and a further fulling of 30 minutes was carried out. The leather was dried and subjected to the usual mechanical treatments. A dark yellow-brown shade was obtained which was fast to light, washing, solvents and grinding.

EXAMPLE 28

Two layers of a solution of 10 parts of the dyestuff salt of Example 24 in 100 parts of the monomethyl ether of ethylene glycol and 250 parts of ethanol were applied to the hair side of unsplit calf-skin. The material was dried, then a layer of a binder was applied, coloured with the preceding solution to increase the covering. The material was dried, a further layer of binder was applied, and the material dried again. This was followed by fixing with a solution of formaldehyde, drying, polishing and facing. Thus a leather uniformly dyed in a brown-yellow shade was obtained, particularly fast to light, to solvents, to washing, to rubbing and to grinding. The finish obtained was particularly transparent and allowed the grain of the leather to be visible.

We claim:

1. An azo dye of the formula:

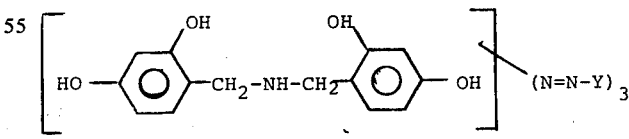

wherein each Y may be the same or different and is phenyl, phenylenephenylamine or naphthyl, each Y contains 0 or 1 nitro or hydroxy, and at least one Y contains at least one sulfonic or carboxylic acid group.

2. An azo dye according to claim 1 which is 2,4,2',4'-tetrahydroxy-3-(4-sulphophenylazo)-5,5'-bis-[6-sulphonaphthylazo (1)]-dibenzylamine.

* * * * *